United States Patent
Tzeng

Patent Number: 6,061,922
Date of Patent: May 16, 2000

[54] LENGTH CORRECTION DEVICE

[76] Inventor: Lee Ching Tzeng, P.O. Box 82-144, Taipei, Taiwan

[21] Appl. No.: 09/059,006

[22] Filed: Apr. 13, 1998

[51] Int. Cl.[7] ....................................................... G01B 5/00
[52] U.S. Cl. ................................. 33/783; 269/165; 33/502
[58] Field of Search ....................... 33/502, 783; 73/1.79, 73/1.81; 269/87.2, 165, 188, 240, 246, 250, 909

[56] References Cited

U.S. PATENT DOCUMENTS

| | | | |
|---|---|---|---|
| 3,496,758 | 2/1970 | Sunnen | 73/1.81 |
| 3,866,897 | 2/1975 | Whalen, Jr. | 269/87.2 |
| 3,975,828 | 8/1976 | Calcaterra et al. | 33/502 |
| 4,274,205 | 6/1981 | Starr et al. | 33/502 |
| 5,167,077 | 12/1992 | Etchell | 33/783 |

*Primary Examiner*—G. Bradley Bennett
*Attorney, Agent, or Firm*—A & J

[57] ABSTRACT

A length correction device includes a rail including two side plates formed with two elongated slots and two fixing blocks fixedly mounted between said side plates, a seat including a main body, a collar, a packing and a knob, a rectangular block formed with a threaded hole and a recess at one side thereof and two pin holes and a threaded hole at a lateral side thereof, and a positioning plate fixedly mounted on said rectangular block.

1 Claim, 8 Drawing Sheets

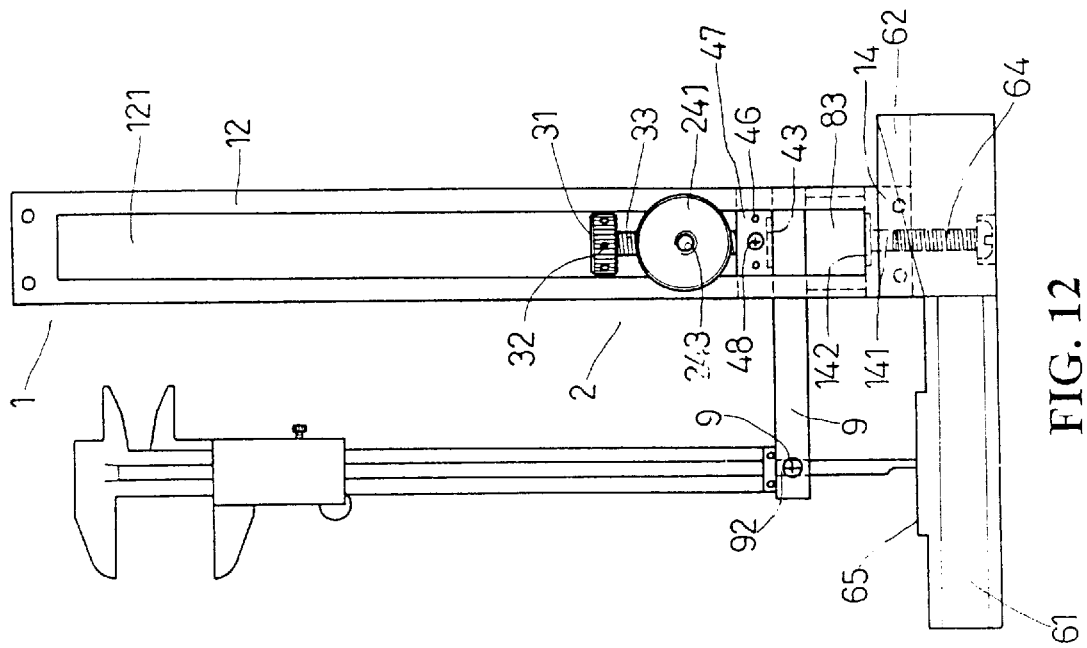
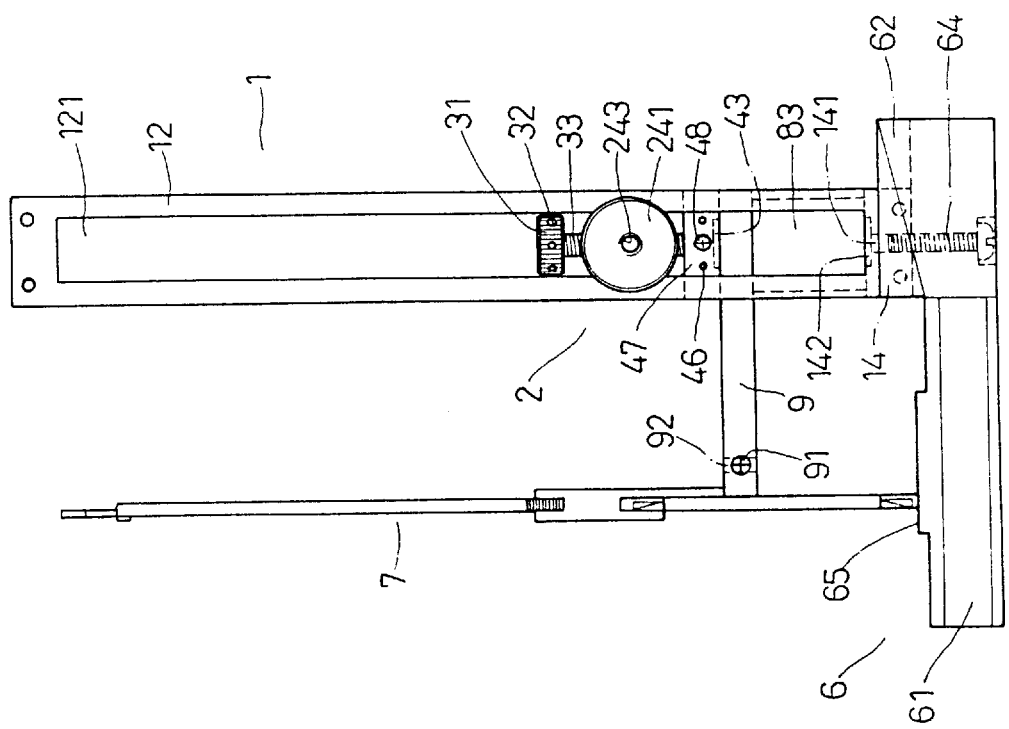

LENGTH CORRECTION DEVICE

BACKGROUND OF THE INVENTION

1. Field of the Invention

This invention is related to an improved length correction device.

2. Description of the Prior Art

A measuring instrument is a device for determining the value or magnitude of a quantity or variable. However, the measuring instrument may lose its accuracy due to long term friction thereby making it have some error in measurement. Therefore, it is an object of the present invention to provide a length correction device which can be used for correcting various kinds of measuring instruments.

SUMMARY OF THE INVENTION

This invention is related to an improved length correction device.

It is the primary object of the present invention to provide a length correction device which can be used for correcting various kinds of measuring instruments.

It is another object of the present invention to provide a length correction device which is easy to use.

It is still another object of the present invention to provide a length correction device which is simple in construction.

It is still another object of the present invention to provide a length correction device which is low in cost.

It is a further object of the present invention to provide a length correction device which is fit for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 10 illustrates another application of the present invention;

FIG. 12 illustrates another application of the present invention;

DETAILED DESCRIPTION OF THE PREFERRED EMBODIMENT

Figure 1:
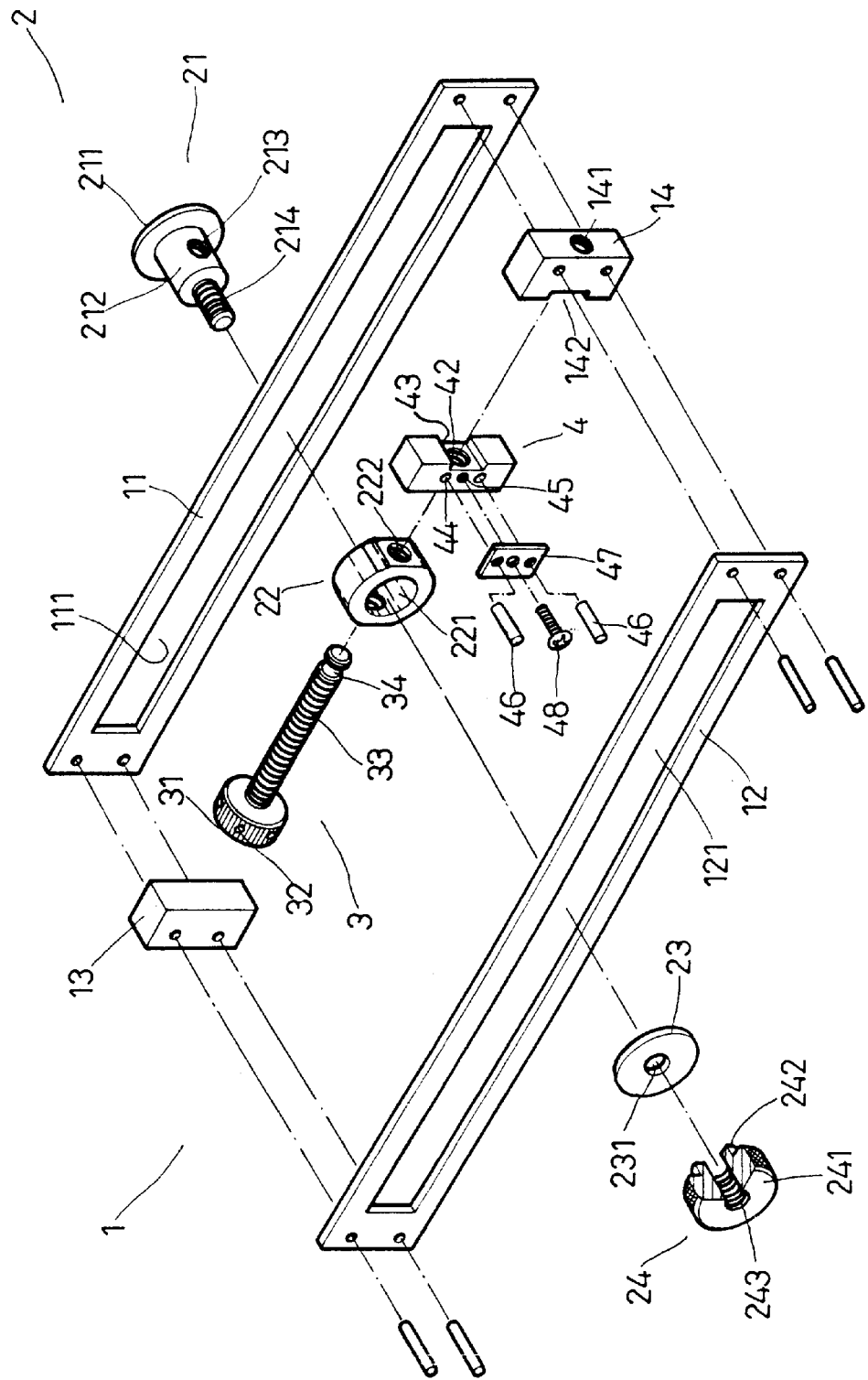
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to FIG. 1, the length correction device a rail 1, a seat 2, a screw rod 3 and a block 4. The rail 1 includes two side plates 11 and 12 formed with elongated slots 111 and 121 respectively. Between the side plates 11 and 12 are fixedly mounted two fixing blocks 13 and 14. The fixing block 14 has a threaded through hole 141 and a recess 142 at its inner side.

The seat 2 includes a main body 21, a collar 22, a packing 23 and a knob 24. The main body 21 has a circular cap 211, a cylindrical portion 212 extending from the circular cap 211 and adapted to fit into the slot 111, and a threaded portion 214 extending from the cylindrical portion 212. The cylindrical portion 212 has a threaded hole 213. The collar 22 has a diameter larger than the width of the slot 111 and has a center hole 221 adapted to receive the cylindrical portion 212 of the main body 21. Further, the collar has a threaded hole 222 aligned with the threaded hole 213 of the main body 21. The packing 23 has a center hole 231. The knob 24 has a cylindrical body 241 formed with a neck 242 and a threaded hole 243.

The screw rod 3 includes a cylindrical head 31 with a plurality of holes 32, an elongated threaded portion 33, and a groove 34 close to the free end of the elongated threaded portion 33.

The block 4 is a rectangular member 41 formed with a threaded hole 42 and a recess 43 at one side and two pin holes 44 and a threaded hole 45 at a lateral side. A positioning plate 47 is fixedly mounted on the block 4 by two pin 46 and a screw 48 extending to the two pin holes 44 and threaded hole 45.

Figure 3:
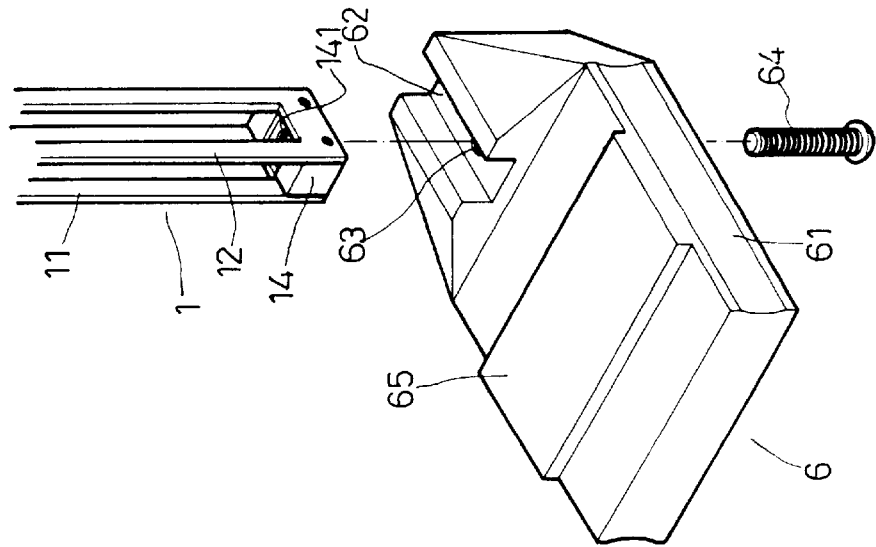
FIG. 3 shows a second embodiment of the present invention.
Figure 2:
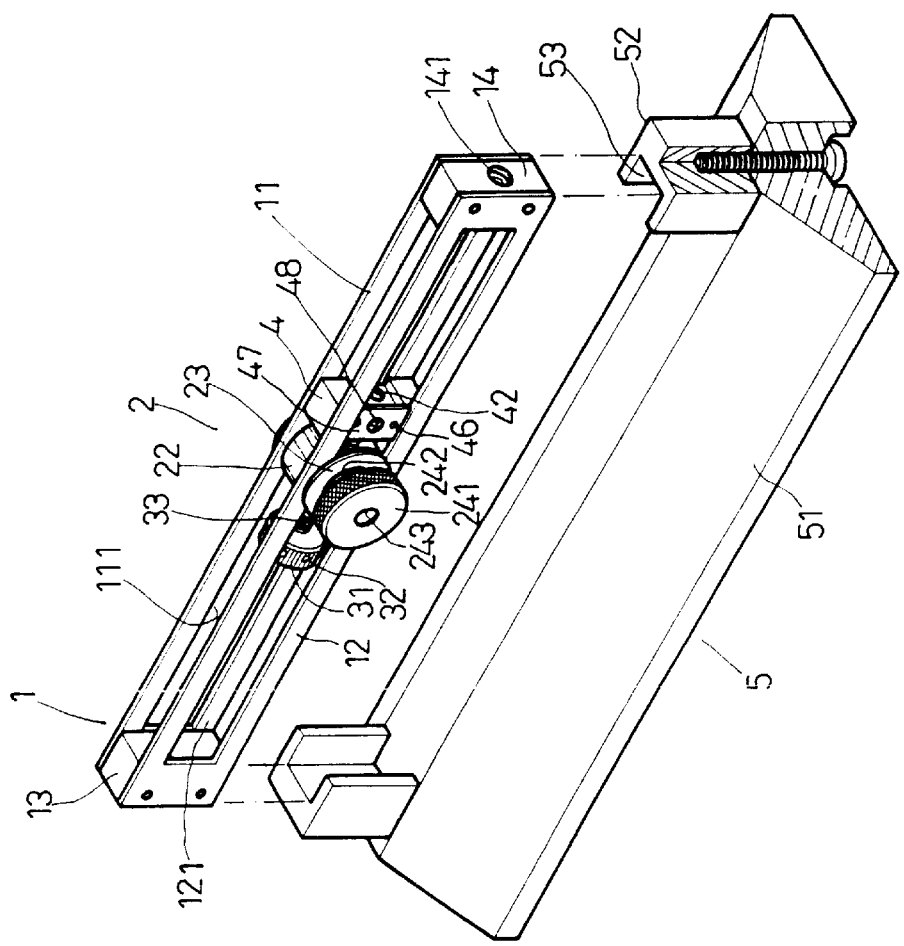
FIG. 2 shows a first embodiment of the present invention.

Referring to FIGS. 2 and 3, the present invention may be used with a jig 5 and a base 6. The jig 5 includes a body portion 51 provided with two opposite lugs 52 having two grooves 53 adapted to receive the present invention. The base 6 includes a body portion 61 having a positioning groove 62 with a threaded hole 63 and a platform 65. The fixing block 14 is fitted within the groove 62 and firmly mounted on the base 6 by a screw 64.

Figure 4:
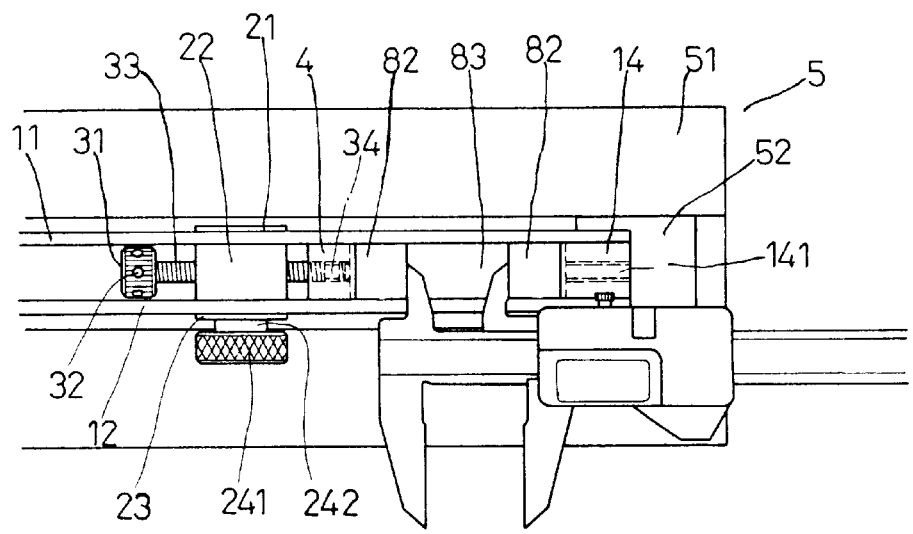
FIGS. 4 and 5 illustrate how to correct a Venier caliper with the present invention.
Figure 5:
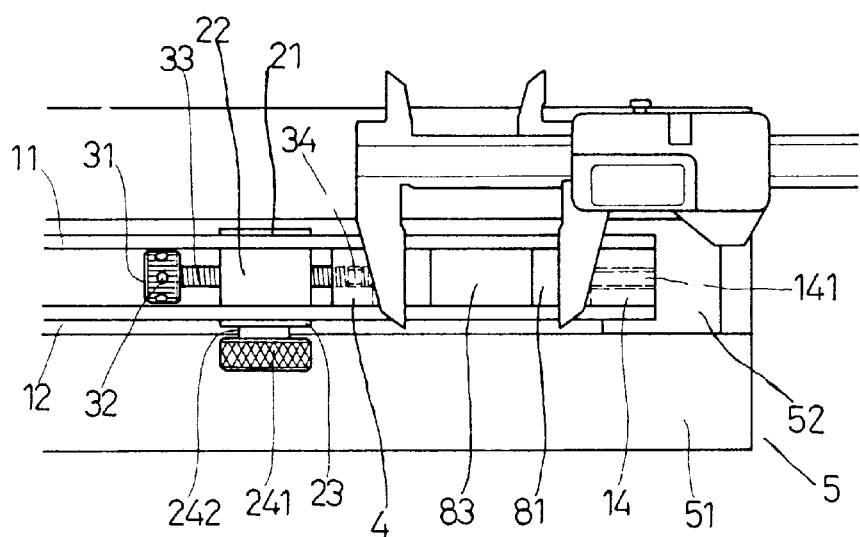
Figure 7:
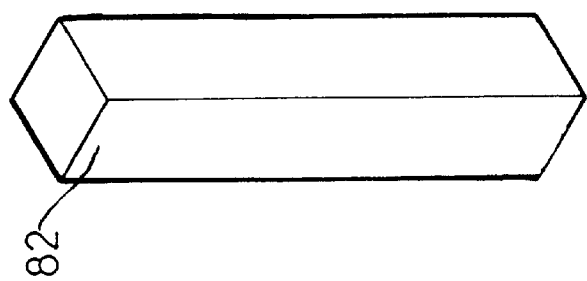
FIG. 7 is a perspective view of a another measuring pawl.
Figure 6:
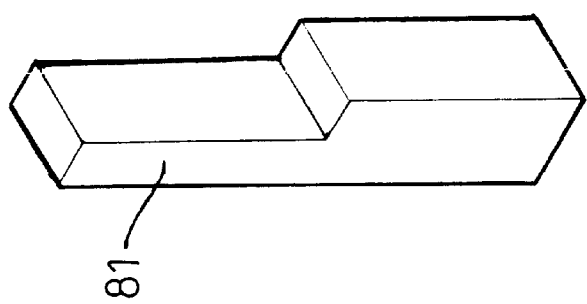
FIG. 6 is a perspective view of a measuring pawl.

When desired to correct a Venier caliper (see FIGS. 4 and 5), the length correction device is fitted between the two lugs 52 of the jig 5 and associated with two measuring pawls 81 and 82 (see FIGS. 6 and 7) and a gauge 83. The measuring pawl 81 is formed with a recess, while the measuring pawl 82 is simply a rectangular block.

Figure 8:
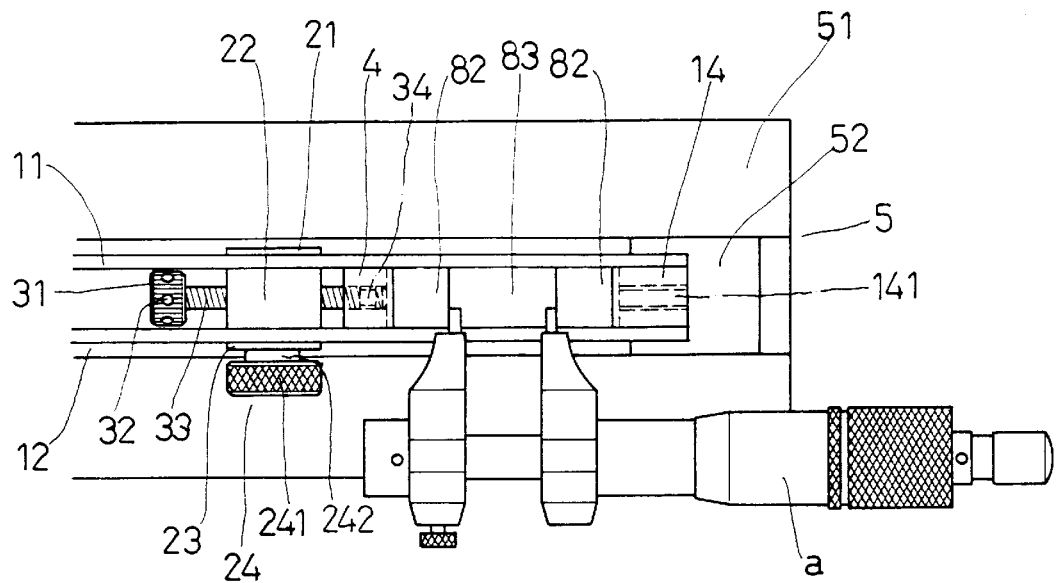
FIGS. 8 and 9 illustrate how to correct micrometer calipers with the present invention.
Figure 9:
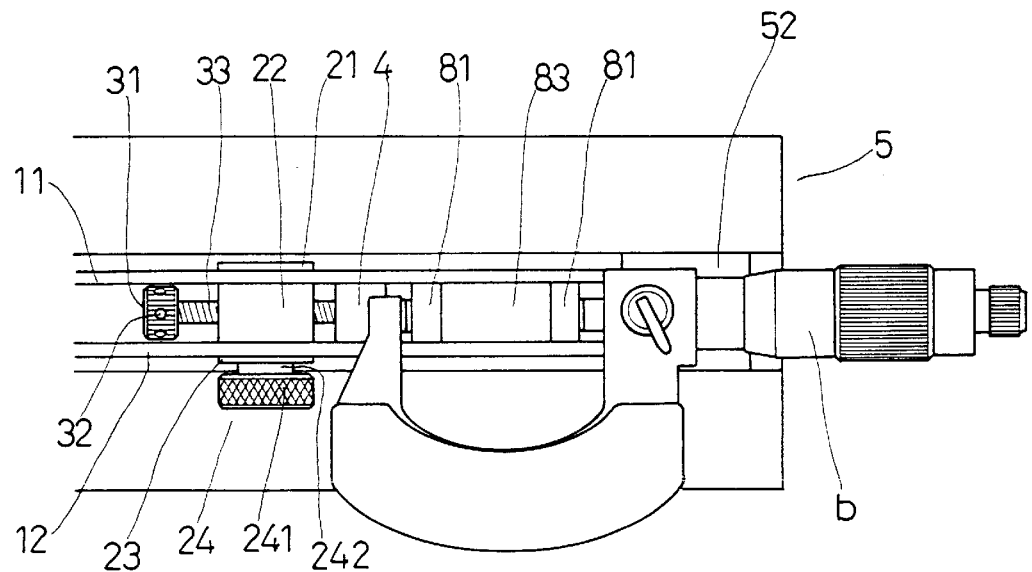

FIGS. 8 and 9 illustrates how to use the present invention to correct micrometer calipers a and b.

Figure 11:
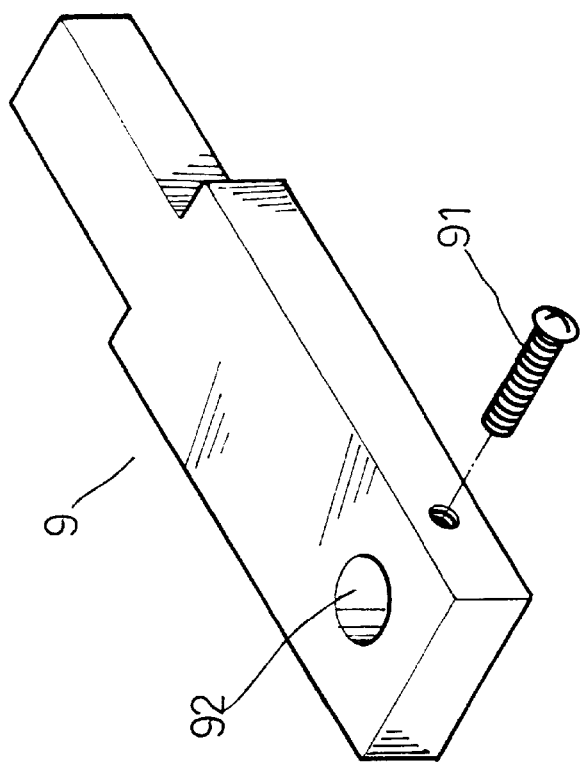
FIG. 11 is a perspective view of the measuring block.

FIG. 10 illustrates how to use the present invention associated with the base 6 to correct a Venier caliper. A measuring block 9 (see FIG. 11) is fitted within the slot 121 at an end and in contact with an end of the Venier caliper.

Further, the measuring rod of the Venier caliper may be inserted through a hole 92 of the measuring block 9 and kept in position by a screw 91 (see FIG. 12).

Figure 13:
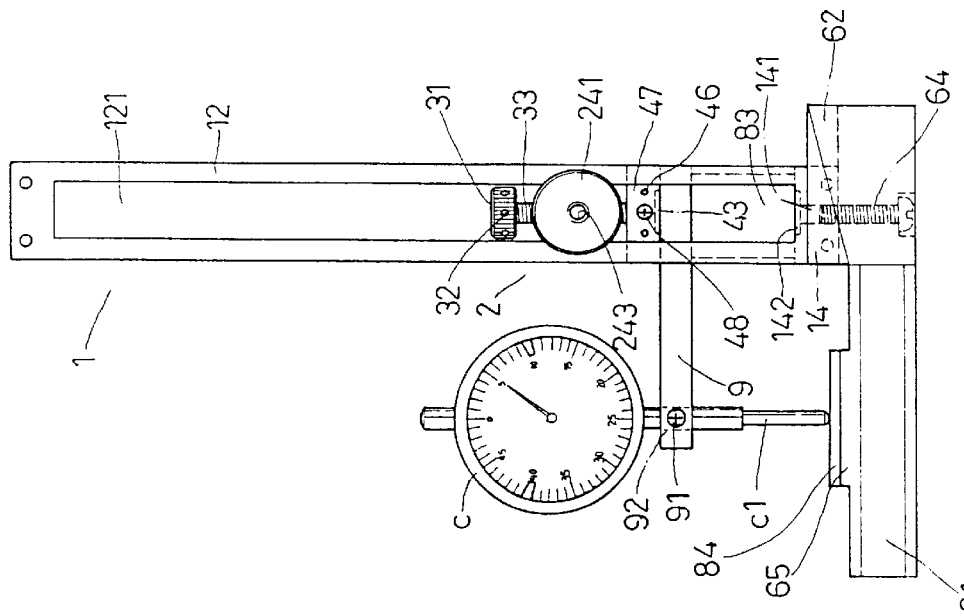
FIGS. 13 and 14 illustrate how to correct a measuring meter.
Figure 14:
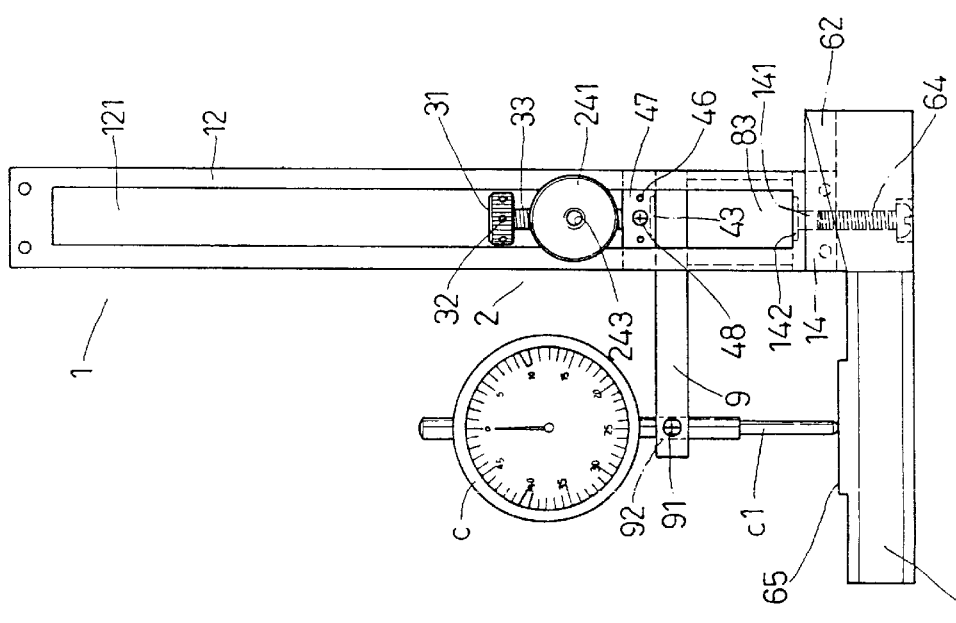

The present invention can be also used for correcting a measuring meter C. As shown in FIGS. 13 and 14, the measuring axle C1 is inserted through the hole 92 of the measuring block 9.

Figure 15:
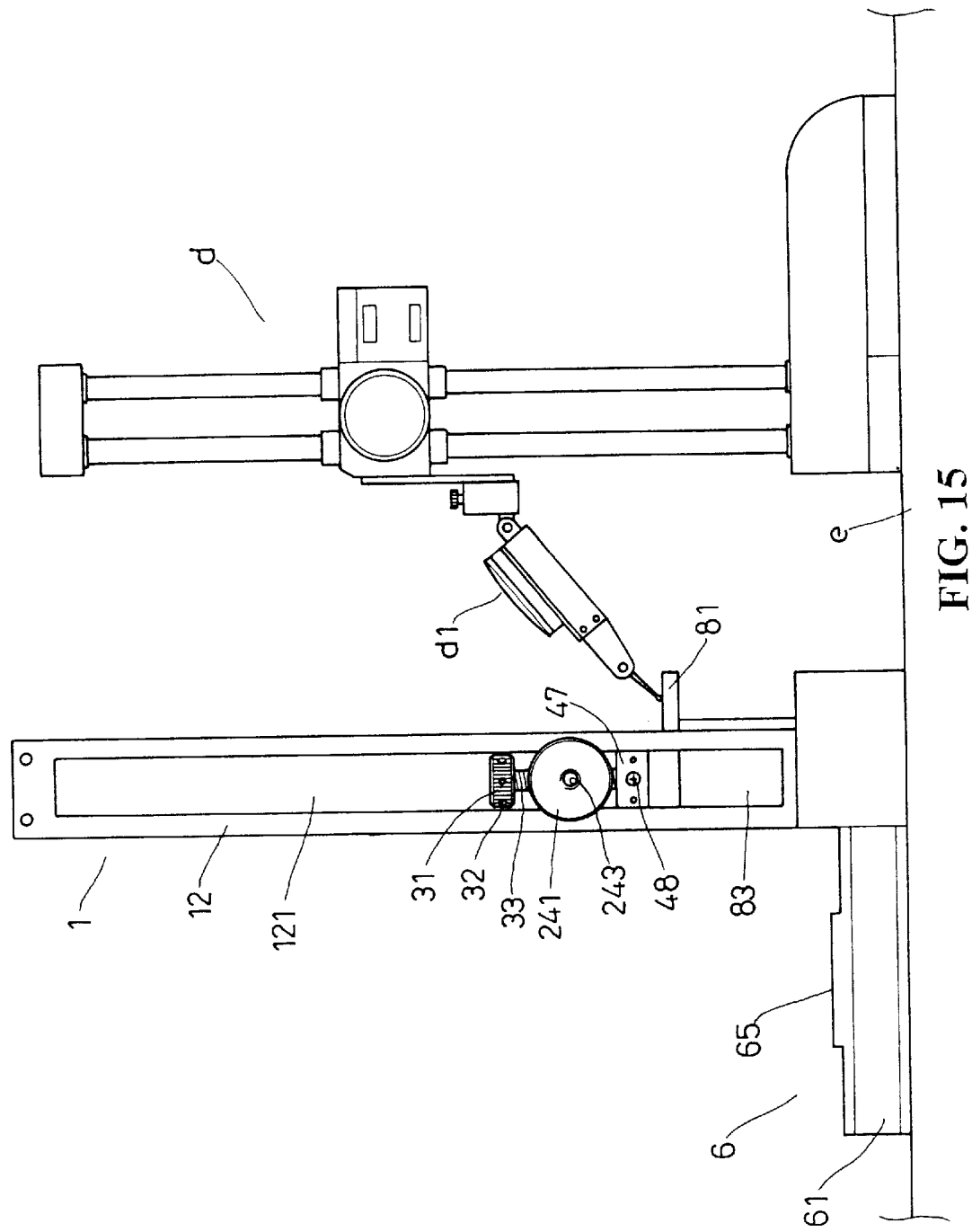
FIG. 15 illustrates how to correct a height measuring meter.

FIG. 15 illustrates how to use the present invention to correct a height measuring meter d. As shown, the axle of the meter d1 is arranged in contact with the top of the measuring pawl 81.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A length correction device comprising:

a rail including two side plates formed with two elongated slots and two fixing blocks fixedly mounted between said side plates;

a seat including a main body, a collar, a packing and a knob, said main body having a circular cap, a cylindrical portion extending from said circular cap and adapted to fit into one of said slots, and a threaded portion extending from said cylindrical portion, said cylindrical portion having a threaded hole, said collar having a diameter larger than the width of at least one of said slots and having a center hole adapted to receive said cylindrical portion of said main body, said collar having a threaded hole aligned with said threaded hole of said main body, said packing having a center hole, said knob having a cylindrical body formed with a neck and a threaded hole;

a screw rod for engaging the seat having a cylindrical head with a plurality of holes, an elongated threaded portion, and a groove close to a free end of said elongated threaded portion; and a rectangular block for engaging the screw rod formed with a threaded hole and a recess at one side thereof and two pin holes and a threaded hole at a lateral side thereof; and a positioning plate 47 fixedly mounted on said rectangular block.

\* \* \* \* \*